P. CHRYSTIE & R. D. CHAPMAN.
PIPE BALL.
APPLICATION FILED SEPT. 7, 1911.
1,056,970.
Patented Mar. 25, 1913.
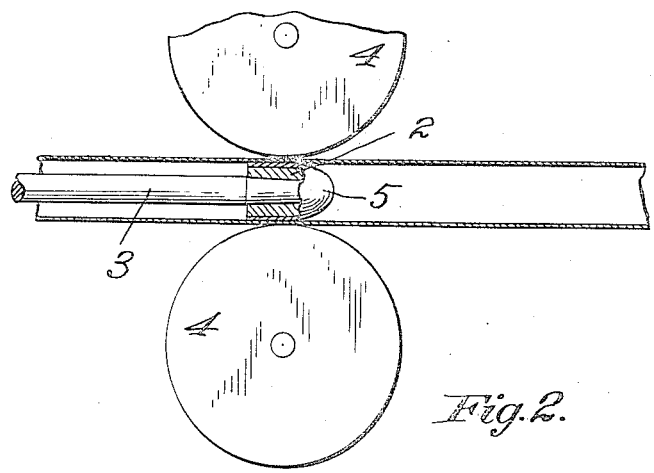
Fig. 2.
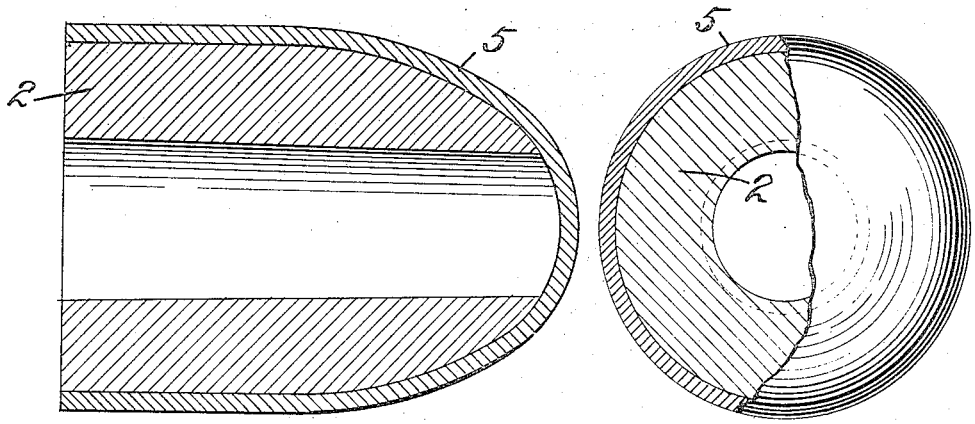
Fig. 1.
Fig. 3.

UNITED STATES PATENT OFFICE.

PERCIVAL CHRYSTIE AND RICHARD D. CHAPMAN, OF HIGH BRIDGE, NEW JERSEY, ASSIGNORS TO TAYLOR IRON & STEEL COMPANY, OF HIGH BRIDGE, NEW JERSEY, A CORPORATION OF NEW JERSEY.

PIPE-BALL.

1,056,970.

Specification of Letters Patent. Patented Mar. 25, 1913.

Application filed September 7, 1911. Serial No. 648,196.

*To all whom it may concern:*

Be it known that we, PERCIVAL CHRYSTIE and RICHARD D. CHAPMAN, citizens of the United States, residing at High Bridge, in the county of Hunterdon and State of New Jersey, have invented certain new and useful Improvements in Pipe-Balls, of which the following is a specification.

This invention relates to pipe balls, sometimes called rolling plugs or welding balls, adapted for use in the formation of tubes or pipes formed either from a steel billet or from sheet metal, the object of the invention being to provide an improved ball inexpensive to manufacture and having considerable durability. These balls have heretofore usually been formed from cast iron, the life of which is comparatively short, since they can be used only during the formation of one or two pipes.

The object, therefore, of the present improvement is to provide a ball in which the body may be made of any desired material, such for instance as cast iron, and provided with a cap or shell of some suitable tough material, such for instance as manganese steel, which will receive the wear and so prolong the longevity of the ball that the same may be repeatedly used in the manufacture of tubes and pipes, it being estimated that a ball constructed in the manner herein disclosed may be utilized for the manufacture of from forty to four or five hundred pipes. These balls act as a mandrel for the tube or pipe when the same is passed between the welding rolls, the pipe or tube passing over the ball so as to facilitate the welding of the edges of the pipe provided the pipe is made from sheet metal, or to facilitate the rolling of the billet into shape when the pipe or tube is made from a steel billet.

In the drawings accompanying and forming part of this specification, Figure 1 illustrates a sectional view of this improved ball; Fig. 2 is a view illustrating in a general way the manner in which the same is used; and Fig. 3 is an end view of the ball with a part thereof broken away.

Similar characters of reference indicate corresponding parts in the figures of the drawing.

This improved ball comprises a body or filler 2 suitably cored for the reception of the rod 3 which is usually used for holding the same in place adjacent to the rolls 4 usually used for either welding the tube or pipe when the same is formed from sheet metal or for rolling the bored billet into shape when the pipe or tube is formed from a steel billet. The ball is usually made of the shape shown, and the filler or body is provided with a cap or shell 5 of some suitable tough material, as for instance manganese steel. This cap in the present instance is drawn or pressed into shape so as to closely fit the ball.

By forming the ball in the manner described the working surface thereof may be made of a comparatively thin sheet of manganese steel which is not only inexpensive but is comparatively easy to form, and by forming this cap or cover in the manner described it does not have to be ground as would be the case if the entire ball were formed of this kind of metal, which is an expensive operation. Moreover, it is immaterial whether the body or filler has blow holes in it or not, since by providing the cap the tube does not come into contact with an imperfect surface as has been the case heretofore when cast iron balls have been used. As is well known, a ball which is cast is liable to have blow holes, which tend to pick up any little particles of scale from the tube, so that during the manufacture of the tube both the ball and the tube frequently become scored, which is a very material disadvantage in the manufacture of tubes. By the present improvement, however, as stated, it is immaterial whether the body or filler has blow holes in it or not, since such body or filler does not come in contact with the tube, as the cap or shell not only protects the tube in the manner stated, but it also forms a tough hard surface having considerable longevity, and when worn out the same body or filler can be again used with a new cap or shell. In other words, by the present improvement the relatively thin cap of tough material or steel is readily replaceable, so that when one cap is worn out another cap may be readily replaced upon the same cast iron body.

We claim as our invention:

1. A pipe ball comprising a body or filler, and a cap covering the end of said body and extending from end to end thereof.

2. A pipe ball comprising a body or filler of one material, and a cap of tough steel covering the end of the body and extending from end to end thereof.

3. A pipe ball comprising a cast metal body, and a cap of manganese steel thereon covering one end thereof and extending from such covered end toward the opposite end.

4. A pipe ball comprising a cast metal body having a drawn or compressed cap of tough steel located thereon and covering one end of the body and extending from the covered end toward the opposite end.

5. A pipe ball comprising a metal body having a removable relatively thin drawn or compressed manganese steel cap located thereon and covering one end of the body and extending therefrom toward the opposite end.

6. A pipe ball comprising a conically shaped body or filler of cast metal, and a relatively thin conically shaped drawn or compressed manganese steel cap thereon inclosing one end of said body.

Signed at High Bridge, Hunterdon county, N. J., this 15th day of August, 1911.

PERCIVAL CHRYSTIE.
RICHARD D. CHAPMAN.

Witnesses:
E. B. Coss,
E. F. Connolly.